July 8, 1958

C. H. GIBSON 2,842,244

MACHINE OPERATOR FOR ELECTRIC TYPEWRITERS

Filed April 4, 1955

Charles H. Gibson
INVENTOR.

BY

July 8, 1958

C. H. GIBSON

2,842,244

MACHINE OPERATOR FOR ELECTRIC TYPEWRITERS

Filed April 4, 1955

Charles H. Gibson
INVENTOR.

BY

July 8, 1958  C. H. GIBSON  2,842,244
MACHINE OPERATOR FOR ELECTRIC TYPEWRITERS
Filed April 4, 1955  5 Sheets-Sheet 3

Charles H. Gibson
INVENTOR.

BY *Clarence A. O'Brien*
*and Harvey B. Jackson*
Attorneys

July 8, 1958  C. H. GIBSON  2,842,244
MACHINE OPERATOR FOR ELECTRIC TYPEWRITERS
Filed April 4, 1955  5 Sheets-Sheet 4

Charles H. Gibson
INVENTOR.

BY *Clarence A. O'Brien*
*and Harvey B. Jacobson*
Attorneys

July 8, 1958     C. H. GIBSON     2,842,244
MACHINE OPERATOR FOR ELECTRIC TYPEWRITERS
Filed April 4, 1955     5 Sheets-Sheet 5

Charles H. Gibson
INVENTOR.

United States Patent Office 2,842,244
Patented July 8, 1958

2,842,244

MACHINE OPERATOR FOR ELECTRIC TYPEWRITERS

Charles H. Gibson, New York, N. Y.

Application April 4, 1955, Serial No. 498,842

19 Claims. (Cl. 197—19)

This invention relates to business machines and more particularly to electromagnetically operating automatic machine operators for electric typewriters which actuate the electromagnets or solenoids which operate the key levers and controls of the electric typewriter, thus automatically and by remote control making the typewriter operative to print preset legends or other text impressions.

Machine operators and similar devices for operating electric typewriters are known by themselves, but most of those proposed are based on the use of a punched control tape controlling the energization of the typewriter solenoids or electromagnets, thus causing the typewriter to print a selected legend or text in accordance with the setting of the punched holes.

Obviously punched tapes capable of controlling the impression of desired legends or texts must be specially prepared in advance. If so prepared the selection of the proper tape and its insertion into the operator are obviously operations which cannot be performed instantly and easily. Tapes are therefore not suitable for short legends which have to be changed continuously.

Other operators which have been proposed in connection with electric typewriters are so-called legend disks each having a number of contacts which are successively contacted by a suitable contact device, thus producing the energization of the typewriter electromagnets in the desired sequence. To write different legends the disk must be exchanged and this operation also requires time and a certain effort which excludes rapid change of short legends.

The various constructions above mentioned are therefore mostly suited for the typing of stereotyped phrases or stereotyped texts and they are not easily adaptable for the printing of tabulated matter, of invoices and other commercial papers in which practically each line contains several exchangeable items each of which has to be changed on each successive line of the invoice or bill and for any new invoice or bill.

Further, in connection with invoiced matter, for example, some of the items to be printed, such as prices, for instance, in the case of an invoice, depend on other items previously selected and printed and it is clearly a major advantage to have these items selected and printed automatically, so that the human operator is relieved of the burden of making the calculation (in the case of prices in an invoice, for instance) and of selecting control means of the machine operator in order to have this item printed by the typewriter. Obviously, punched tapes or legend disks are not capable of performing this type of operation.

It is, therefore, the main object of the invention to provide a legend writing automatic operator for electric typewriters which permits a convenient easy and instant selection of a suitable legend of limited length from a large number of legends and an easy and ready change of the legend so that such change of the legends can occur several times during the writing out of a single line.

It is further a main object of the invention to arrange the legends appearing in one line in such a manner that a plurality of legends selected by the operator will be automatically typed in proper sequence on a line, although the legends themselves differ from line to line.

It is a further object of the invention to provide a machine operator in which the proper sequence of the selected legends is automatically produced by electromechanical means.

It is a further main object of the invention to select automatically the operating means for that legend or those legends which depend on and are positively linked with a previously selected legend or a combination of previously selected legends and to operate these means automatically in proper sequence.

It is a further main object of the invention to provide operating means which are specially adapted for controlling the typing of long and of brief legends.

It is a further main object of the invention to so connect the operators for the legends of a line that operation may progress automatically during or after any manuel selection of a legend.

It is a further object of the invention to combine the data contained on certain legends which have been freely selected by the operator, such as the number of items and the individual price of each item and to automatically type the result of such combination in proper sequence and in the space or column reserved for this legend or figure thus performing a function replacing, for instance, that of a calculator.

Further and more specific objects and advantages will become subsequently apparent in the following specification as they reside in the details of construction and cooperation hereinafter more fully described and claimed, reference being had to the accompanying drawings forming a part hereof.

In the drawing an embodiment of the invention is illustrated. It is however to be understood that the invention is shown by way of example only and the drawing, while intending to illustrate the principle of the invention and the best mode of applying the principle, do not intend to give a survey of the various manners of applying the invention to different cases. A departure from the embodiment illustrated is, therefore, not necessarily to be considered as a departure from the principle of invention.

In order to obtain full understanding of the invention a specific example will be described which relates however only to one of the many applications of the machine operator, which example has been selected at random, the number and specific character of the legends or other matter typed being immaterial. It is also immaterial whether stereotyped phrases or tabulated or invoiced matter or any other matter is caused to be typed by the electric typewriter. It will be assumed by way of example that the machine operator is used for typing invoices, bills or similar business papers and that always a plurality of different legends appear on each line which have to be selected separately.

For instance, the line may read:

½ doz.   Campbell Mechanical Pencils R H @  
$2.50    $15.00

The invoice of course may contain any number of similar lines as it may incorporate a large number of different merchandise.

Further the description of an item on the line may also cover a plurality of lines, a case which occurs quite frequently so that special provision must be made for this case. The most frequent case in connection with invoices is that each line differs from the next line with respect to every one of the items enumerated and also with respect to number and prices.

The human operator has therefore to select the number of items (for instance, ½ doz. in the example mentioned above) and the second item (Campbell Mechanical Pencils R H) describing the category of goods. The third item, however, is preferably not one selected by the human operator, but is the result of a multiplication of the unit price ($2.50) with the selected number of goods (½ doz.). In the example illustrated it is assumed that the total price of the goods forming in this case the third item is automatically printed after the two first items have been printed.

The example therefore is so selected that it contains as well freely selected legends such as those recorded in columns 1 and 2 and other legends which have to be supplied by the machine operator, selecting them in accordance with the combination of freely selected legends.

It will further be noted that some of the legends consist of a number of words to be typed (column 2 in the example above given) while others consist solely of one figure or of a plurality of figures, the number of which is, however, small.

It is therefore of advantage, although by no means necessary, to perform the operation of the typewriter by somewhat differently organized means, some of these means being used for printing texts of some length and some of them being much simplified as they are merely used for printing a figure or a limited number of figures.

Figure 2:
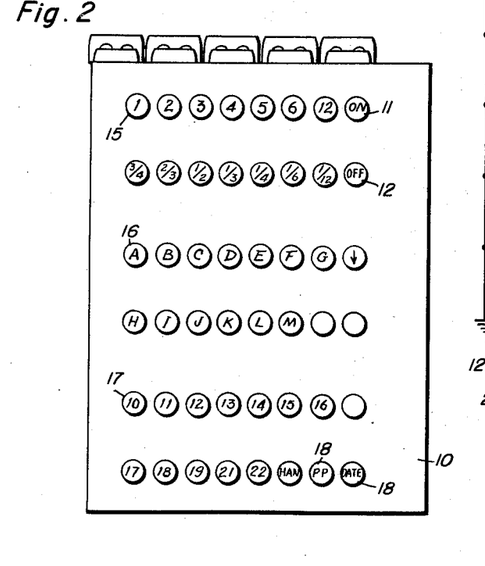
Figure 2 is a plane view of the switchboard for the human operator.

The machine operator of the typewriter thus comprises a selecting switchboard 10 which is in front of the human operator and which is diagrammatically shown in Figure 2 as a push button switchboard.

It comprises the usual "on" and "off" switches 11, 12 which are preferably connected with a power relay switching the current of a power line on and off. This power relay will be described below and it is so constructed that the switching on and the switching off of the current is produced by simple momentary contact obtained by pressing one of the two buttons 11 or 12.

In addition to these two power control buttons three groups of push buttons are shown.

The first group of push buttons 15 controls the selection of the indicia in column 1 of the above stated invoice which in this example is relative to the number of units of the same category. In the example this number is expressed by using customary trade units such as dozens, gross, cases or the like.

It was assumed in the above mentioned example that the desired indicia for column 1 can be selected by pressing a single button, the number of units being limited. A plurality of buttons may however be used for selecting the indicia for this column, the method being in this case similar to the method used for selecting an item in the next group.

This next group of push button switches contains two sub-groups of push button switches 16 and 17. One push button of each of these sub-groups must be operated in order to select the desired item. The two sub-groups of push-button switches are used to permit a selection among a much larger number of items. For instance, 2×12 push button switches are sufficient to select one item out of 144 different items. It will also be understood that a still larger number of sub-groups may be used in order to cover a still larger number of items from which the desired item may be selected.

The description of the items to be placed in column 2 of the example above stated, forms part of a list which contains in addition to the proper description of the items also the combination of key letters and figures which provides the key for the operation of the push button switches 16, 17. For instance, the item described in the example above stated "Campbell Mechanical Pencils R H" may be listed as A12 thus indicating that for printing this description it is necessary to operate key A and the key numbered 12.

In addition, certain push buttons 18 in each group may be reserved for the direct selection of certain special operations which are, however, not illustrated in the example, for instance, for operating the typewriter so as to add some further descriptive or other text to the one selected. To give an example the words "excluding postage and commercial insurance" or some frequently occurring text not specifically connected with a specific item may be typed either on a separate line or as a continuation of the text selected.

Figure 3:
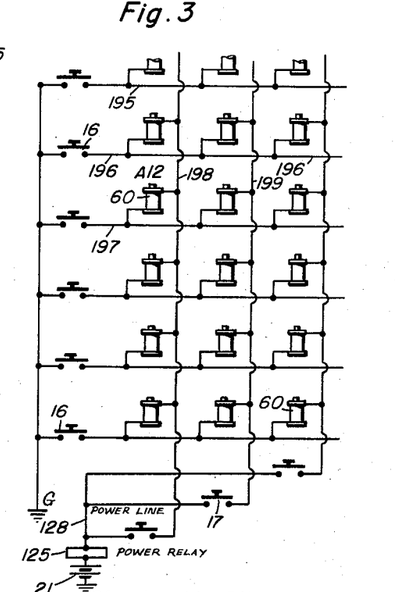
Figure 3 is a diagram of the connections made by the push button switches of the switchboard illustrated in Figure 2.

The way in which the two sub-groups of push button switches cooperate is illustrated in Figure 3. The electromagnets 69 which control the operation of the various contact segments to be described below are arranged and connected so as to form column and line groups. Upon presing one of the push button switches 17 a column of electromagnets are connected with the power line at 128 which leads to the battery or other source of power 21. Likewise if a push button switch 16 is operated a line of electromagnets 60 is grounded at G. Clearly therefore the simultaneous operation of one of the switches 16, for instance the one marked "A" and the operation of one of the switches 17 marked "12" operates a single electromagnet 60 operating a single one among the many contact devices.

Obviously, it is not necessary that the actual arrangement shows columns and lines. The electromagnets may simply be aligned in one or two rows and only their connections must correspond to that illustrated in Figure 3.

It has been assumed in this description that the buttons 16 and 17 are pressed simultaneously. However, the spring pressed push button switches may be provided with means (not shown) producing a certain retardation in the return movement so as to give the human operator some limited time within which to operate the buttons 16, 17 one after the other.

Figure 4:
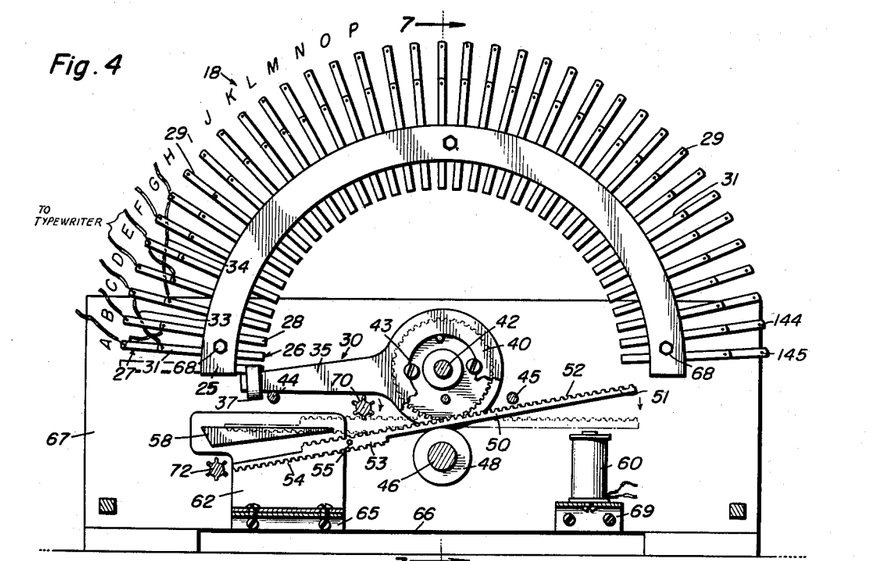
Figure 4 is a diagrammatic elevational view of a contact device with an arcuate contact bank holding a large number of contacts.
Figure 5:
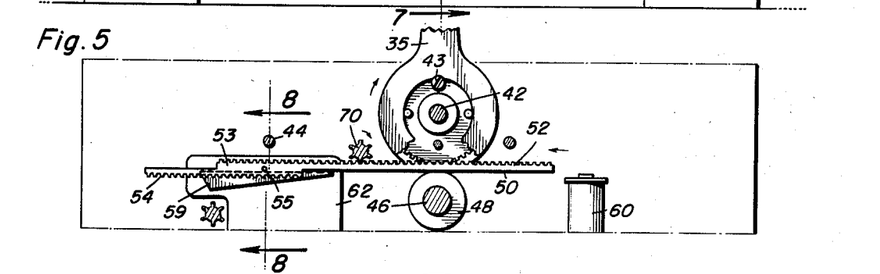
Figure 5 is a fragmentary elevational view of the contact device illustrated in Figure 4 showing the parts in a different position and more specifically in a position in which the contact arm of the device is advanced.
Figure 6:
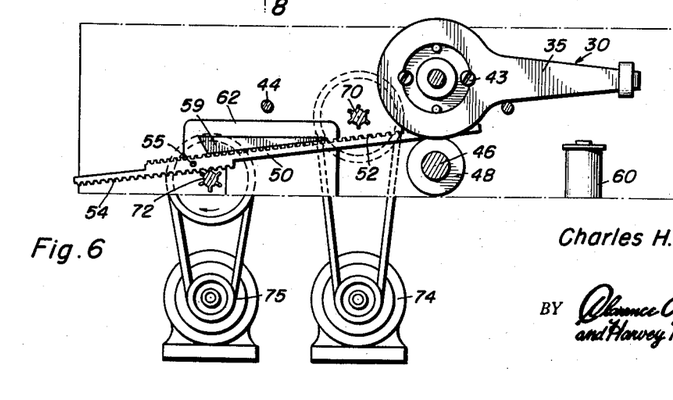
Figure 6 is a fragmentary elevational view of the same contact device illustrating said contact device in a position in which the contact arm is returned.

The contact devices which are controlled by the push button switches 16 and 17 are shown in Figures 4 to 6. Such a contact device comprises a double contact bank 18 mounted on an insulated semi-circular segment 25 supporting radially arranged contact strips. Two series 26, 27 of such strips are provided. Each of these contacts is held by the segment 25 in such a manner that the contacts of a series are completely insulated from all other contacts of the same series and of course also from the contacts of the other series. All contact strips of both series are preferably arranged in the same transversal plane.

The contacts of the inner series 26 of radial contacts have inwardly projecting ends 28 over which a contact arm 30 may slide in a manner described below. These contacts have also outwardly projecting ends 31 which, however, do not project as far outwardly as the contacts of the series 27. These last named outer contacts have outwardly projecting ends 29 each of which is wired to one electromagnet 151 (Figure 1) of an electric typewriter of standard construction. Preferably these outwardly projecting ends 29 of all contact segments are wired in such a way that they are systematically connected with all the electromagnets operating the key levers and the other operating levers of the electric typewriter. In Figure 4 this has been indicated by means of the letters A, B, C, D, E . . . associated with the outer radial contact ends 29 of the series 27.

When wired in this way all the double contact banks which are arranged in substantial parallelism one behind the other (three of these contact banks being shown in Figure 7 in which figure however the transversal or axial distance and dimensions are exaggerated) may be connected with the same typewriter key electromagnets. Therefore, this connection may run from segment to segment and from there to the typewriter electromagnet as indicated in Figure 7 by wire 32.

The outwardly projecting ends 31 of the contact series 26 are now so connected with the outer series 27 that the words to be typed are formed by the connection between the ends 31 of successive contacts along the segment 25 with those contacts of the series 27 which correspond to the letters or figures forming the words or other text of the typewriter. For instance, in Figure 4 the word "cage" is the first word of the text and the first five contacts are connected by means of insulated wires with the third, first, seventh and fifth contacts of the series of contacts 27 which, as will be clear, operate the electromagnets of the key levers for the letters C, A, G, E, respectively. Obviously, therefore, if the energizing circuits for these electromagnets are closed over this connection the word "cage" will be typed by the electric typewriter.

Figure 7:
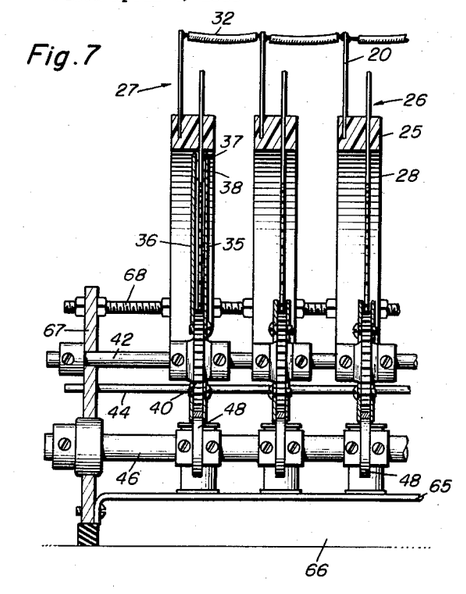
Figure 7 is an elevational view of the device illustrated in Figure 4, illustrating an assembly with a number of arcuate contact banks, the section being taken along line 7—7 of Figure 4.
Figure 8:
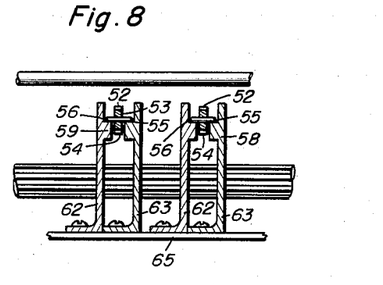
Figure 8 is an elevational fragmentary sectional view of a portion of the device, the section being taken along line 8—8 of Figure 5.

The ends 28 projecting radially and inwardly from segments 25 cooperate with the contact arm 30 which in the specific modification shown in Figure 7 is provided with two spaced members 35, 36 each member having an annular hub portion and an outwardly projecting contact carrying portion. These members are made of elastic material pressing the projecting ends towards each other. The ends are preferably provided with inwardly projecting slide contacts 38 which slide on the contact strips contacting them from both sides. A protective shoe of plastic material 37 may guard these contacts against accidental contact making and may also stiffen the end portion of the contact arm.

The hub portions of the two contact arm members 35, 36 are preferably mounted on both sides of a pinion 40 which is journaled on an axle 42 in such a manner that it is freely rotatable thereon. The rotation of the pinion 40 thus rotates the contact arm 30 as the pinion is fixedly connected with the contact members 35, 36 by means of screws 43. The rotation of the pinion thus moves the end of the contact arm 30 along the contacts of the bank which is carried by the arcuate segment 25.

To prevent the contact arm from occupying undesirable positions or from being rotated too far by the pinion stop rods 44, 45, preferably of insulating material are arranged transversely so that all the contact arms of the axially aligned contact banks may rest on these stop rods.

The movement of the pinion and thereby also of the contact arm is produced by a rack member 50 provided with two racks one rack 52 meshing with the pinion 40. The rack member is held in permanent engagement with the pinion by means of a roller 48 which is rotatably mounted on a transverse axle 46. The rollers 48 may be held in place by suitable collars mounted on the transverse axle 46 as seen in Figure 7.

The rack member may be made of magnetically permeable material and may therefore serve directly as an armature for the actuating electromagnet 60. When it is preferred to use non-permeable material the rack member must be provided with a special armature.

As stated, the rack member 50 carries two racks 52 and 54 having their teeth turned in opposite directions. The two racks 52 and 54 are somewhat spaced along the rack member but overlap to a certain extent and between the two overlapping racks 52 and 54 a section 53 is formed which carries laterally projecting supporting pins 55 and 56. These supporting pins may be carried in certain positions of the rack member on the triangular lateral supports 58, 59 which project from closely spaced uprights or bracket members 62, 63, projecting upwardly from a board 65 mounted on the baseboard 66. The baseboard, as seen in Figure 7, carries at its end the transverse walls or boards 67 which support the ends of the axles 42 and 46 and the stop rods 44, 45. Likewise these boards or walls 67 support bolts or transverse spindles 68 which hold the segments 25.

The baseboard 66 also carries a support 69 on which all the actuating electromagnets 60 are mounted. These electromagnets may be either aligned, if sufficient space is available, or may be arranged according to a pattern permitting the closest arrangement compatible with their independent function.

The rack member 50 cooperates with two pinion rods or wires 70, 72 each consisting of a rod or wire into which teeth have been cut along the entire length of the rod or wire.

The pinion rod 70 is so positioned, as will be seen in Figure 4, that the rack 52 of each rack member 50 engages the pinion when in substantially horizontal position in which its end has been attracted by the actuating electromagnets 60. Normally, when the electromagnet is not energized, the rack member 50 adopts the position shown in Figure 4 which is somewhat inclined towards the horizontal. Upon energization of the actuating electromagnet 60 the rack member 50 adopts the position shown in dotted lines in Figure 4 in which the rack 52 of the rack member 50 engages the pinion wire 70.

The second pinion rod or wire 72 is arranged in such a position that the rack 54 of the rack member 50 engages the said pinion rod or wire 72 when the rack member is in an inclined position with respect to the horizontal as shown in Figure 6.

The two pinion rods or wires 70 and 72 rotate in the same direction, but will move the rack member in opposite directions when engaging the racks 52 and 54 respectively because the two racks point in opposite directions.

It will thus be seen that the rack member 50 may swing up and down. The normal position or position of rest of the rack member 50 is that shown in Figure 4 in which it is advanced towards the right in this figure as far as possible while being in an inclined position towards the horizontal in which the end 51 of the rack member is above the actuating electromagnet 60 but somewhat removed from said end, the distance being however such that the energization of the actuating electromagnet moves the end 51 downwardly, thus bringing the rack member into its horizontal position. The rack member, as already stated, is held between the pinion 40 and the roller 48 and may swing on the roller without however getting out of engagement with the pinion 40.

As soon as the electromagnet 60 below the rack member is energized the end 51 of the rack member is moved downwardly so that the rack member occupies a substantially horizontal position in which the rack 52 of the rack member engages the pinion rod or wire 70. The pinion rod or wire 70 rotates permanently and is driven in the manner explained below in the direction of the arrow. Therefore, when rack 52 of the rack member engages the pinion rod or wire 70 the rack member is moved towards the left in Figure 4. During this movement the pinion 40 is rotated, thereby rotating contact arm 30 over the arcuate contact segment. During the advance of the rack member towards the left in Figure 4 the pins 55 move over the triangular guides 58, 59 so that the engagement of the rack 52 of the rack member and of the pinion rod or wire 70 is maintained even after de-energization of the electromagnet 60 and after the rack member has been moved out of reach of the electromagnet 60. The pins 55 and the triangular guides hold the rack member 50 in its horizontal position (see Figure 5).

When the rack member is further advanced the pins 55 and 56 reach the end of the triangular supports 58, 59 and advance beyond the supports. The rack member 50 when no longer supported drops down and its rack 54 which points downwardly now engages the pinion rod or wires 72 (see Figure 6).

As during this advance of the rack member the pinion 40 and the contact arm 30 has been rotated the contact arm has reached the end of the contact segment when the rack member drops after the pins 55, 56 have overrun the triangular support 59.

When the rack member drops, it engages the pinion rod or wire 72 which also turns permanently in the direction of the arrow, but which moves the rack in opposite directions towards the right in the Figures 4 to 6 as the teeth of the rack 54 are turned downwardly. The rack therefore returns moving in a direction which is somewhat inclined towards the horizontal, but during this movement still engaging the pinion 40 and therefore rotating the contact arm 30 in a direction which is opposite to that in which the contact arm was first moved. The contact arm 30 is thus returned to the position shown in Figure 4, the position shown in Figure 5 being an intermediate position. At this point, namely when the contact arm has been returned the rack 54 leaves the pinion rod or wire 72 and the rack comes to a standstill in the position shown in Figure 4.

Figure 12:
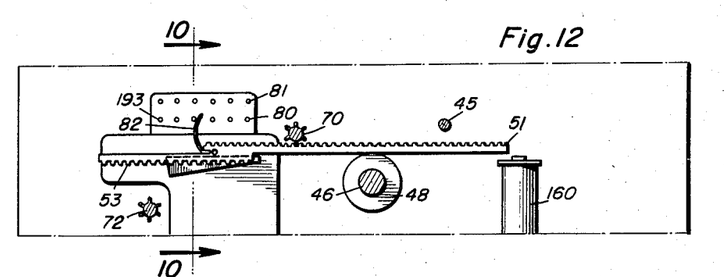
Figure 12 is a view similar to Figure 11 showing another position of the contact arm operating rack during the advance of the latter.

It has already been mentioned that in the arrangement shown in Figures 4 to 6 the pinion rods 70, 72 are permanently driven during operation, the driving means for said pinion rods consisting, in the arrangement illustrated in Figure 6, of two separate electric motors 74, 75, each of said motors driving one of the said pinion rods. However, also both pinion rods, especially if they rotate in the same direction, may be driven by the same motor as illustrated in connection with Figures 11 to 13 to be described later.

Figure 9:
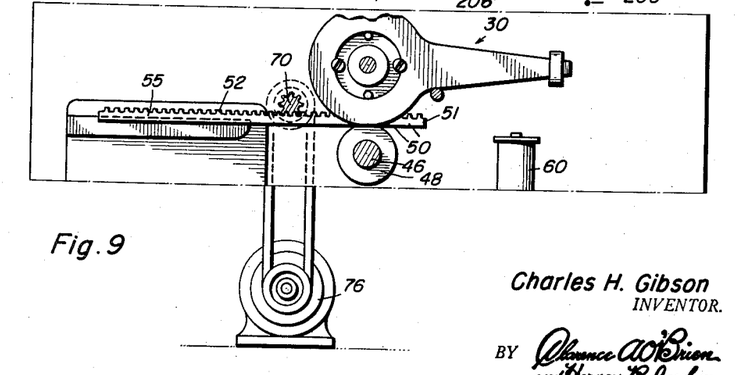
Figure 9 is a fragmentary sectional view of the device in which the return of the contact arm of the device is produced by using a reversing motor.

A further modification permitting to move the rack back and forth which is much simplified and therefore has many advantages illustrated in Figure 9. This arrangement is provided with a reversible motor moving the rack back and forth, by driving the pinion rod or wire 70 either in one or in the other direction. Therefore, only a single pinion rod 70 is arranged and the rack member 50 is only provided with a single rack 52. The rack member is supported by a roller 48 and is in engagement with pinion 40 in the manner already described.

The driving and supporting members for the pins 55, 56 projecting from the rack member 50 need not be of the triangular shape illustrated in Figures 4 to 6 but may be straight ledges 79 or lateral supports projecting from the brackets 62, 63. The rack member 50 is held in its inclined position of rest above described. In this position of rest the end 51 of the rack member is above the electromagnet, but on account of the inclined position of the rack member is somewhat spaced therefrom.

When the electromagnet attracts the end 51 of the rack member 50 the latter engages the pinion rod 70 and is moved towards the left in Figure 9. The pins 55 and 56, as soon as the movement of the rack member towards the left starts, are supported on the ledges 79, keeping the rack member 50 in its substantially horizontal position during its movement. This movement also produces rotation of the pinion 40 and of the contact arm 30 which movement is independent of the energization of the electromagnet 60 once this energization has brought the rack member 50 into the horizontal position in which the pinion 70 was engaged and the pins 55 and 56 were moved to such an extent that they are supported on the ledges.

When the contact arm 30 reaches the last contact the electric motor 76 is reversed in a manner described later and the rack member 50 is again advanced towards the electromagnet 60 (towards the right in Figure 9) until the pins 55, 56 leave the supporting ledges 79. Then the rack member 50 again drops to the inclined position and any further movement of the rack member stops. During this return movement however, pinion 40 has also been rotated in a direction opposite to that in which it was originally rotated and the contact arm has therefore again returned to its original position.

In many cases, for instance in the case of the invoice used as an example, short descriptive legends and legends containing many words succeed each other on the same line and it is preferable to use different contact devices for short and long legends.

Preferably the arcuate contact segments such as shown in Figures 4 to 6 which have fifty contacts and more are only used when the legend to be printed consists of many words or of polysyllabic words or the like. For legends to be printed which consist only of a single letter or figure or a small number of letters or figures or other characters it is preferable to use a simplified arrangement with a short contact bank in which the contact arm is removed from the contacts during its return movement so that it becomes unnecessary to provide means for cutting out circuits during such return movement. This simplified arrangement is illustrated in Figures 10 to 14. It occupies less space and may use very short contact banks.

Such a simplified contact device comprises contact banks provided with two series 80, 81 of contacts, each series forming a straight line. One series 80 cooperates with the contact arm 82 while the other series is again connected with the operating electromagnets 150 of the electric typewriter which operate the keys, the space key and other operating mechanisms of the electric typewriter.

The contacts and the contact arms may be arranged in many different ways, but in the example illustrated the contacts of this drive consist of contact rods 83, 84 held between insulating plates or shields 85 which are mounted on the supports 62, 63 which may be identical with those used in the previously described arrangement.

The contact arm 82 is preferably mounted on the rack member 50 within a slot 87 provided at the end of the rack 52. In this slot the end of the contact arm 82 is held by screws or rivets. The rack member and the roller 48 may be permanently grounded in this arrangement by grounding the axle 46. Thereby also the contact arm 82 is grounded.

Figure 13:
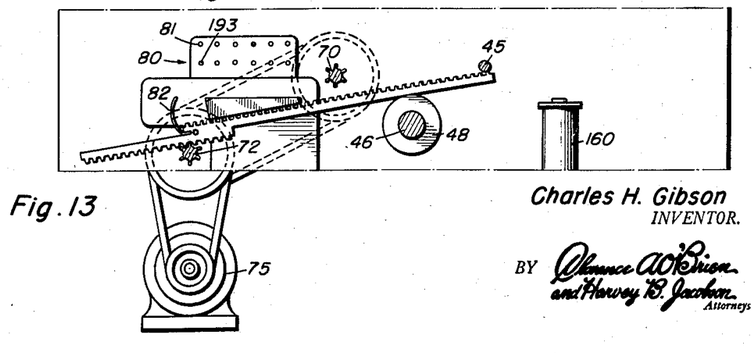
Figure 13 is a view similar to Figures 11 and 12 showing the contact operating rack in the position for return of the contact arm.

The arrangement in all other respects is very similar to that already described in connection with Figures 4, 5 and 6. The rack member is again supported on the roller 48 and may be provided with the racks 52, and 53 having teeth pointing in opposite directions. These two racks 52 and 53 cooperate with the pinion rods or wires 70 and 72 while the end 51 of the rack member serves as an armature and may be attracted by an operating electromagnetic 160. Moreover, the rack member 50 is provided with the pins 55, 56 which may be supported on the laterally projecting triangular members 58, 59. A single motor 75 may be used for driving both pinion rods 70 and 72 as illustrated in Figure 13.

While it would be possible to use the same pinion wires or rods 70, 72 for driving the racks of all contact banks, whether short or arcuate, it is preferable to arrange separate pinion rods or wires 70, 72 for the short contact banks and to drive them separately. This permits an overlapping of the operation of the contact arms of both types of contact banks without having to wait for the return of the contact arm, operated previously, the contact arm for the short contact bank section and that for the arcuate contact bank being in this way separately grounded.

It will be noted that the contact arm 82 of the short contact bank may be grounded permanently by grounding the roller 48 and axle 46 or some portion connected with the axle or roller. The contact arm, during its return movement, leaves the contact series 80 entirely, so that the grounding of the contact arm does not in any way affect the circuits connected with the contacts 80 when the contact arm is returned to its original position.

Figures 10, 11, 14:
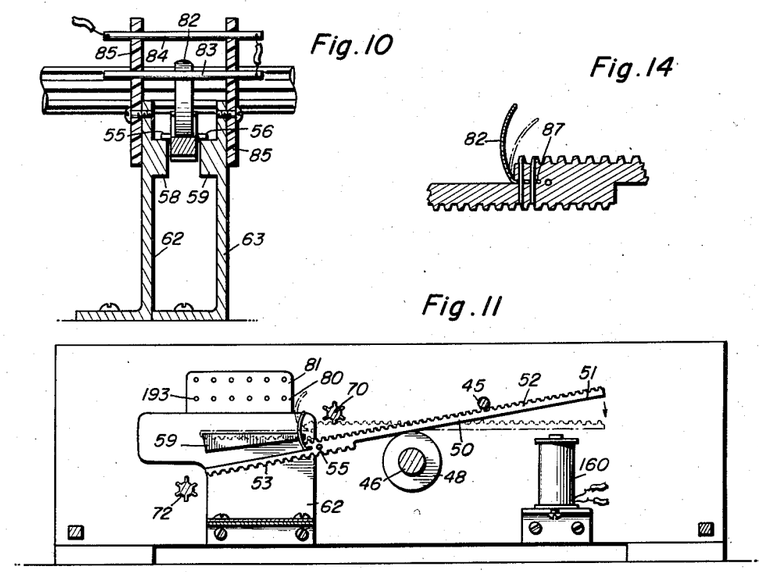
Figure 10 is an elevational sectional fragmentary view through a portion of one of the smaller contact devices of the machine operator with contact banks arranged in a straight line, the section being taken along line 10—10 of Figure 12.
Figure 11 is an elevational view of one of the contact devices with a short contact bank having their contacts arranged along a straight line, the position of the contact arm advancing rack when at rest being shown in full lines and the position upon energization of the operating electromagnet being shown in dotted lines.
Figure 14 is a sectional elevational view of that portion of the rack which holds the contact arm of the devices illustrated in Figures 11 and 13.

As seen in Figure 10 the contact arm 82 may consist of a spring which when advanced by the rack member 50 passes over and is slightly bent by the rods 83 forming the contacts of the bank 80, the contact lasting for a sufficient time to secure operation of the electric typewriter.

Figure 1:
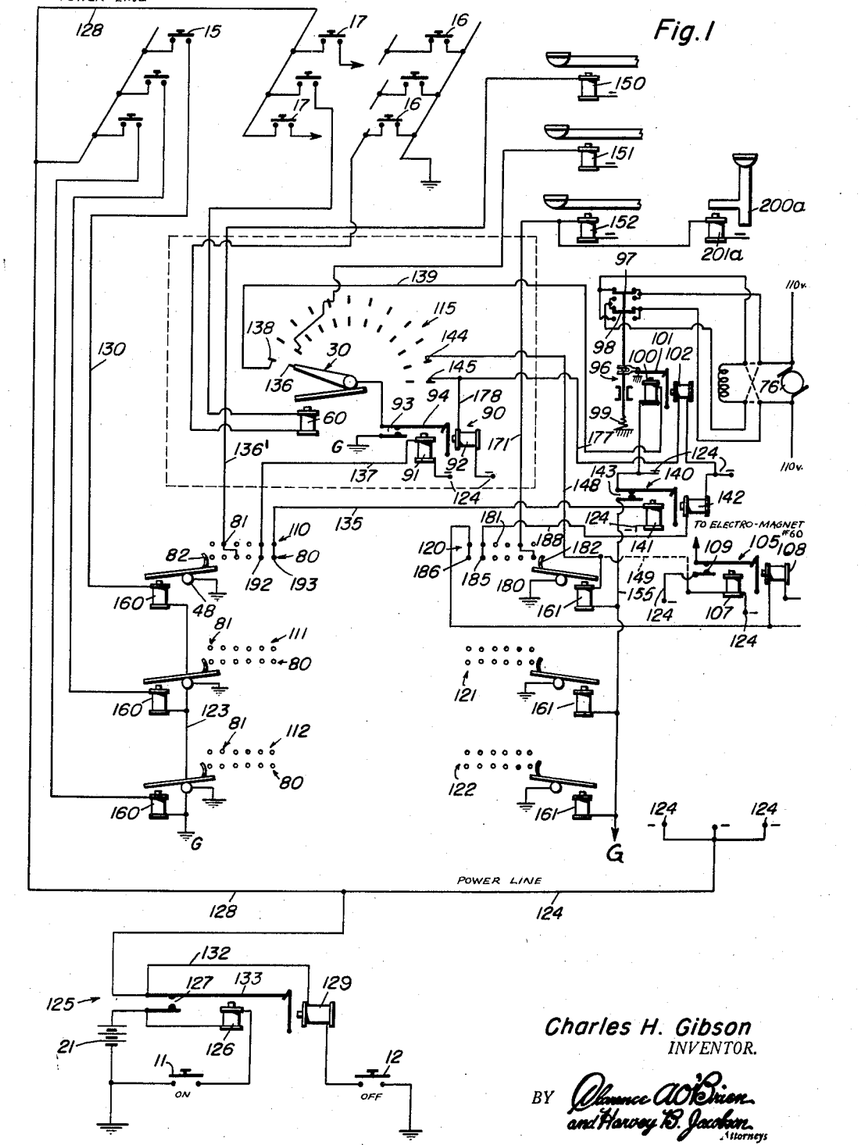
Figure 1 is a diagram of the connections between the various units of the machine operator.

Referring now to Figure 1 it is seen that each of the above described mechanisms is further equipped or connected with relays and other units in order to produce the desired operation.

Thus it will be seen from Figure 1 that the grounding of the contact arm 30 is controlled by a relay 90, this relay being inserted into the ground connections of all contact arms and being necessary in order to remove the ground from the contact arm during the return movement. The relay used in this arrangement is a self locking relay consisting of the two coils 91, 92, the coil 91 controlling the contacts 93 but bringing also the armature into a position in which it is locked by a latching means such as a latching tooth which is retractable, as it forms part of the armature of a second relay coil 92, which, upon energization, releases the armature of coil 91. This relay construction is widely used and need not be described or illustrated in detail. The coil 91 thus controls by means of the two contacts 93 the ground connection of arm 30 over the axle 46 and roller 48. Upon energization of coil 91 the ground contacts 93 are closed and the armature 94 is locked; it is only released upon energization of coil 92.

The connections for a system shown in Figure 9 embodying a reversing motor 76 driving an arm of an arcuate segment are also shown in Figure 1. The motor is controlled by a reversing relay 96. The forward coil 100 of the reversing relay operates two movable bridge contacts 97 and 98 each cooperating with two pairs of fixed contacts. The armature operating the bridge contacts is pulled into its normal position by a spring 99. Upon energization of the coil 100 the armature 101 pulls the bridge contacts into their upper positions in which they are locked by the armature of the reversing coil 102. Upon energization of the reversing coil 102 the armature 101 is released and is returned to its original position under the action of spring 99.

In the normal position of the armature 101 the motor 76 is connected for rotation in one direction, while upon energization of the coil 100 the connections are reversed and the electric motor 76 rotates in the opposite direction. The normal connections are again restored upon release of the armature 101 upon energization of coil 102.

As above explained, reversal of the motor 76 returns the contact arm 30 to its original position. In the modification shown in Figure 1, the first contact 136 of the contact bank 115 is connected with contact segment 138 which by means of line 139 is connected with the coil 100 of the reversing relay, causing the motor 76 to turn in the direction advancing the arm 30 over the contact segments.

In some cases the description of an item in an invoice covers more than one line or contains a number of characters which exceeds the number of contacts arranged on an arcuate contact bank of a contact device. To avoid special contact segments for these items more than one arcuate contact segment may be used for controlling the typing of such a legend. To allow the successive use of several contact segments for the typing of a continuous text a connection 149 shown in dotted lines leads from one of the contacts at the end of a contact bank to a special relay 105 having an operating coil 107 and a release coil 108. This relay is a delayed action relay equipped with well known means for delayed action, such as a copper slug attracted to the core, a high negative resistance element in its energizing circuit, etc. The relay contacts 109 operated by relay 107 control the operating electromagnet 60 of the second contact device 115 which is used to complete the legend and which is usually the one adjacent to the first contact device. The connection of the contacts 144 of the first contact device with the electromagnet 161 is omitted. The contact arms 30 of the two contact devices controlling the typing of a single legend operate in immediate succession and the typewriter is thus controlled by the successively contacted contacts of the two successively operated contact segments 115.

The normal case, however, is that only one contact device is needed. In this case the contact 144 located near the end of the contact bank is connected with line 148 leading to one of the next contact devices 120, 121, 122 which will be described below.

The arrangement shown in Figure 1 also comprises in addition to the arcuate contact devices, of which there is a large number from which the legend to be used for a particular case is to be selected, the contact devices with a short rectilinear contact bank designated by 110, 111, 112 . . . . Further, the arrangement also comprises the further contact devices with short contact bank 120, 121, 122 . . . and the selector switchboard with the selector buttons 15, 16 and 17 which have only been indicated diagrammatically on top of Figure 1, without showing the details illustrated in Figures 2 and 3.

Further, the arrangement also comprises a power relay 125 cooperating with the two "on" and "off" push buttons 11, 12 which control the supply of power currents to the contact devices.

The power relay 125 is again a self-locking relay having a relay coil 126 operating the contacts 127 and a release coil 129. When the contacts are closed the power line 128 is connected with the push buttons 15, 16, 17 and with the various power outlets of the relays and of other devices which are indicated in the diagram. When the off switch 12 is closed the release coil of the relay is operated over the contacts 127 which are closed at this time, and the armature 133 is released, opening the contacts 127 and thereby also de-energizing the release coil of the relay together with the de-energization of the entire arrangement.

As diagrammatically indicated the buttons 15, when one of them is pressed by the operator to select the first legend, control the circuits 120 of the electromagnets 160 of the contact devices 110, 111, 112 . . . .

The contacts 80 of the contact banks of these devices are connected with the contacts 81, as has already been described which are in their turn connected by means of the circuits 136' with the typewriter solenoids or electromagnets 150, 151, 152 . . . corresponding to the characters of the legend, so that, when the button 15 corresponding to the mark "½" is pressed, the contacts 81 of the device selected by this button is wired to the key of the typewriter carrying the "½" type, the wiring of the other contact banks corresponding to the other characters of the legend selected, for instance, to the d, o, z, period keys.

It will be noted that one of the last contacts of the contact banks 110, 111, 112 . . . preferably the contact preceding the last contact of the bank is connected with the circuit 137 which includes coil 91 of the ground contact relay 90 of the arcuate contact device 115. Therefore, as soon as the contact device 110, 111, 112 . . . is operated and the contact arm 82 has reached the end of the contact bank thereby causing the typewriter to type the legend or figure selected, the contact segment 115 is made ready by grounding the contact arm 30, so that the next operation namely the selecting of the proper contact segment 115 may now take place.

Figure 15:
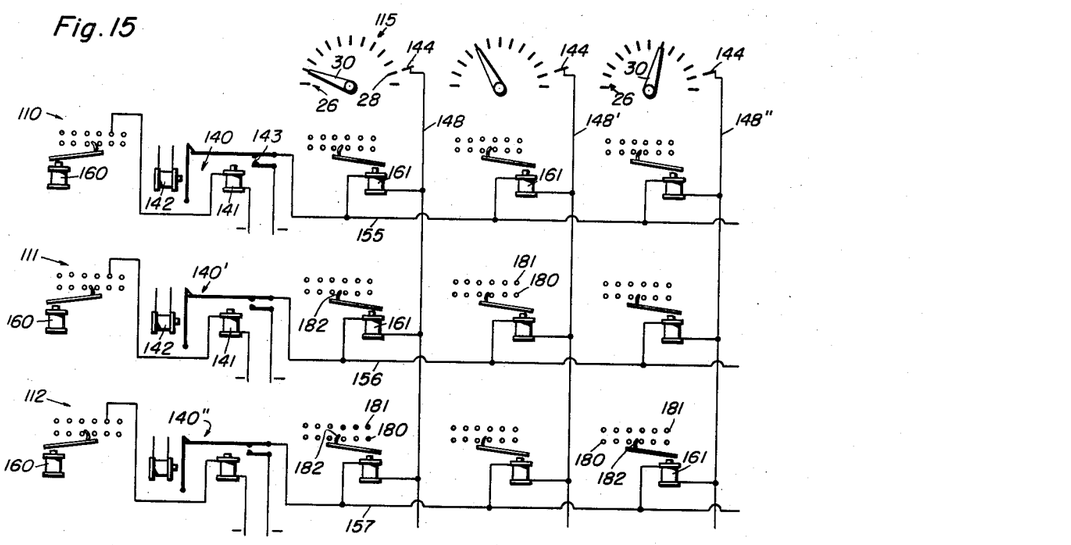
Figure 15 is a diagram of the connections illustrating the selection of the operating magnet of the contact device by automatic means dependent on a number of previously made manual selections.

The last contact of the series 80 of the contact devices 110, 111, 112 . . . , reached by the contact arm 82, is connected with the relay 140 which is again a self-locking relay with an operating coil 141 and a release coil 142. This relay prepares the selection of the devices of the series 120, 121, 122 . . . as illustrated in Figure 15. The energizing of coil 141 of relay 140 picks out a series of operating magnets 161 for said contact devices 120, 121, 122 . . . among which the proper magnet will be automatically selected by the contact devices 115. The latter device has already been described. One of the last contacts 144 of each contact bank 115 is connected with a column of operating electromagnets 161 of the contact devices 120, 121, 122 . . . while the relays 140, 140', 140'' are each connected with one of the last contacts of the contact devices 110, 111, 112 . . . . The contacts 143 controlled by the coils 141 of relays 140 . . . each control the connection 155, 156, 157 . . . respectively with which a row of magnets 161 of the contact devices 120, 121, 122 . . . is connected on one side. The same magnets shown as being ararnged in rows and columns are provided with a second connection 148, 148', 148'' which connects all the electromagnets of a column with one of the end contacts 144 of the contact devices 115. The contact 144 being grounded when the contact arm 30 reaches this contact, the circuit is completed over a magnet 161 when the contacts 143 of relay 140 close, as these contacts are connected with a power line. Thus, a specific electromagnet 161 is selected by the cooperation of two contact devices of the series 115 and 110, 111, 112 . . . .

The contact devices 120, 121, 122 . . . are practically duplicates of the contact devices 110, 111, 112 . . . . Their contacts 180 are overrun by the contact arm 182 and are connected with the second series 181 of contacts which in their turn by means of lines 171 are connected with those operating solenoids or electromagnets 150, 151, 152 . . . of the typewriter which operate the keys for the correct legend. In the example shown this legend is the price of the items. The end contacts 185, 186 of each of the contact devices 120, 121, 122 have special operative connections. Contact bars 185 are connected with the release coil 142 of relay 140 which relay therefore is returned to its normal position. The end contact 186 is connected with the release coil 108 of the relay 105 whenever such a relay is provided for typing long legends or a plurality of lines. When the contact arm 182 therefore reaches the last contact the relay 105 is returned to its normal position.

The impulses sent by the contact devices 120, 121, 122 . . . wired to type figures representing prices or other figures to be added, may simultaneously also be sent to the operating electromagnets 201a of an adding machine 200a. The adding machine then sets the figures which have been transmitted.

Figure 16:
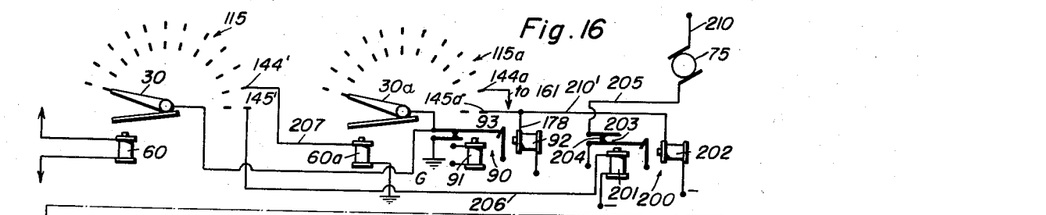
Figure 16 is a diagram of the connections used for a continuous operation of two contact devices of the type shown in Figure 6.

When two contact devices 115, 115a are to be operated in succession to type out a legend having a number of characters exceeding the number of contacts and the contact device is of the type illustrated in Figure 6, the connections shown in Figure 16 may be used. The first contact device 115 with its contact arm 30 and electromagnet 60 is identical with the device 115 in Figure 1 and with the device shown in Figure 6. The contact arm is connected with the contacts 93 of the relay 90 which controls the common ground connection G of all contact arms 30 of all contact devices 115, 115a. However, one of the last contacts 144' of the contact device 115 is in this case connected with the electromagnet 60a of the second contact device 115a, which completes the legend which could not be fully typed by the contacts of the device 115. The contact device 115a is completely identical with device 115 with respect to construction, its elements being designated with the same reference characters with the addition of reference character "a." The last contact 145a of the contact segment is in this case connected with the operating coil 201 of the relay 200. The operating coil is provided with an armature 203 controlling contacts 204, which in their turn control the energizing circuit 205 of the motor 75 which drives the return pinion 72 (Figure 2).

When contact arm 30 of device 115 reaches contact 144' magnet 60a is energized over conductor 207. As release coil 92 is not energized at this time, relay 90 remains operative so that arm 30a remains grounded. Arm 30 then reaches contact 145' thereby energizing the operating coil 201 of relay 200 which attracts its armature 203 and opens at contacts 204 the circuit 210 of motor 75. Motor 75 stops and ceases to drive wire pinion 72. When the rack member 50 drops, after the pins 55 leave the shelves 58, 59 it rests on the pinion wire without moving, or being retained.

In the meantime as magnet 60a was energized arm 30a started to rotate and is moved until it reaches contact 144a, which corresponds to contact 144 of Figure 1 and is connected with electromagnet 161, starting the actuation of contact device 121 as explained in connection with Figure 1. Finally contact 145a is reached closing the circuit 178 of release coil 92 of relay 90, and circuit 210' of release coil 202 of relay 200. The two release coils operate returning the relay armatures of their operating coils to their original positions. Relay 90 thus cuts off the ground from the arms 30 and the contacts 204, opened by the coil 201 when energized again close the circuit 210 of the motor 75. The motor starts to rotate pinion 72 and the rack members 59 start to return both contact arms 30 and 30a at the same time.

In the example described on account of the complex connections necessary for printing the result of the addition, it is assumed that the figures which have been set on the machines are added manually by operating the adding machine and that the result of the addition is then manually typed on the sheet which received the preset impressions on the typewriter. The adding machine 200 is only an accessory the operation of which is performed manually or by means not described.

Some of the contact devices 115 may be directly connected to one of the push button switches 16 or 17 in order to provide certain stereotyped phrases. The connections with the devices 120, 121, 122 . . . and also with the devices 110, 111 and 112 may in this case be omitted.

Operation

The operation of this device has already been partly described. It is assumed that in the arrangement illustrated in Figure 1 the contact device 115 is driven by a reversible motor while the contact devices 110 . . . and 120 . . . are driven by permanently rotating pinion rods or wires, driven by motors 75 which may be connected to a power line. It will, however, be clear that these two methods have been only selected in order to illustrate different driving methods in the drawings.

It has also been assumed that it is desired to type a line on the electric typewriter which corrseponds to the line of the invoice which has been previously mentioned as an example.

Under the assumption the operation starts by pressing the push button switch marked "on," an operation which will energize the relay 125 by closing the circuit of the operating coil 126. The energization of coil 126 closes the contacts 127 thus energizing all the power lines 128, 124 by connecting them with a source of electric energy 21. The power line connections leading to the relays are not shown but are marked in the diagram by a "—" sign and by the reference character 124.

Now a push button 15, corresponding in the example chosen to the legend "½ doz." is selected and operated whereby a circuit is closed running from the power line 128 to, say the top switch 15 in Figure 1, line 130, magnet 160, to ground G; magnet 160 attracts the end 51 of the rack 50 (Figures 11, 12 and 13) which moves into the horizontal position shown in dotted lines in Figure 11. Thereby the pinion rod 70 is engaged by the rack member 50 which is advanced by said pinion rod. The advancing rack moves the grounded contact arm 82 over the contacts 83 of the contact series 80. These contacts are connected with the contacts 81 which in their turn are connected with those electromagnets 150 . . . of the typewriter which operate the key levers for the characters corresponding to the legend selected and the spacer key lever of the electric typewriter. When the grounded contact arm 82 reaches the end of the contact bank it makes contact with contact 192 whereby the operating coil 91 of the relay 90 is energized over a circuit connected wtih a power line 124 and including the coil 91, the line 137, the contact 192, the contact lever 82 and the ground. The relay 90 then closes the contacts 93 and locks itself. The contacts 93 connect the ground G with the contact arm 30 of all the arcuate contact devices 115, the contact arm of which rests on the contact 136 in this case in which it is supposed that the contact device is operated by a reversing motor. The circuit of the forward coil 100 of the reversing relay 96 is thereby closed, moving the contact carrying armature rod 97 and the bridge contact 98 to the upper position and locking itself in this position. The electric motor 76 is thus energized which starts to move the pinion rod 70 (Figure 9).

Meanwhile the contact arm 82 of the device 110 has reached the end contact 193, thus closing the operating coil 141 of the relay 140. The coil 141 closes the contacts 143 (Figure 15) which energizes the line 155 connected with all the magnets 161 of one row of contact devices 120, connecting this row with a battery or other source of current. Simultaneously when contact arm 82 has reached the last contact, pins 55, 56 have overrun the supports 59 (Figures 11, 12, 13) and the rack member 50 on which the contact arm is mounted drops to the position shown in Figure 13. The rack member is now returned to the position shown in Figure 11 by the pinion rod 72 and therefore the contact device 110 is again in its starting position.

Meanwhile a list of the goods and of the unit prices which have to be printed on the invoice had been consulted and it was found that the item "Campbell's Mechanical Pencils H R" have the key number A12 for example. Therefore, the push button switches 16 and 17 which correspond to these indications are pressed. The pressing of the push button switch 16 connects for instance one row of operating electromagnets 60 of the contact devices 115 with ground. Let it be assumed that this row is connected with a line 197 in Figure 3.

The pressing of the push button 17, on the other hand, connects the column of operating electromagnets 60 of the devices 115 with a power line 128 (Figures 1 and 3). This column may be serviced, for instance, by line 198. In this way the magnet 60—A-12 alone is operated. This magnet is the only electromagnet the circuit of which is closed by the lines 197 and 198. The operating electromagnet 60—A-12 pulls the end 51 of the rack member 50 downwardly, so that the rack member 50 will assume the position shown in Figure 4 in dotted lines and will engage the pinion rod 70 which moves the rack member toward the left in Figure 9. During this movement the pins 55, 56 reach a position in which they will be supported by the support 79 which therefore maintains the rack member in its operative position even after the rack is moved out of reach of the electromagnet and after the electromagnet has been de-energized.

This movement also entails the movement of the pinion 40 thus moving the contact arm 30 of the selected device 115 over the contacts which are so wired as to produce the desired legends.

If more than one contact device is necessary in order to type the legend then a second contact device, adjacent to the first contact device is operated which contains contacts so wired and connected with the electric typewriter that certain parts of the legend which could not be wired with the first contact device are wired on the second contact device. The electromagnet 60 of the second contact device is in this case connected with the contacts 109 of the delayed action relay 105 which are closed after relay 105 has been energized, the energization of this relay being obtained by contacts 144 of the first contact device when reached by the contact arm 30. The circuit energizing the relay 105 runs from ground G over contacts 93, contact arm 30, contacts 144, lines 148 and 149 to coil 107 connected with the power line 124.

The electromagnet 60 of the second contact device 115 then operates its rack member 50 after a short time during which arm 30 returns in the manner already described.

When only a single contact device is used and the arm 30 reaches the contact 144, the line 148 is connected with ground G over the contact arm. This line 148 leads to a column of electromagnets 161 of the contact devices 120, 121, 122 . . . .

As the line 155 supplying a row of electromagnets 161 has been connected with a source of current by means of the contacts 143 of one of the relays 140, 140' . . . a single one of the magnets 161 will now be energized which has been selected by one of the contact devices 110, 111 . . . and one of the contact devices 115 . . . . The contact device 120, 121 . . . operates the typewriter in such a manner that the product of the unit price (associated with the device 115) and of the quantity (associated with the device 110) is now typed.

When the contact arm 30 has reached the end contact 145 it grounded simultaneously the circuits 173 of the release coil 92 of the relay 90 and a circuit 177 of the release coil 102 of the reversing relay 96.

The first named release coil releases the armature 94 and removes the ground from the contact arm 30; the second release coil releases armature 101 which falls back, so that the contact bar with the bridge contacts 98 and 97 drops again into its lower position reversing the connections of motor 76. The electric motor 76 now drives the pinion rods 70 (Figure 9) in the opposite direction, the rack member 50 moves to the right in this figure, moving the contact arm 30 back into its starting position until in the end position the pins 55 and 56 leave the supports and the rack member 50 again drops, disengaging itself from the pinion rod 70, while its end 51 is raised and is vertically above the operating electromagnet 60.

The original position of the contact devices 115 is thus restored.

When the selected electromagnet 161 of the contact devices 120, 121 . . . was operated, the operation of the device started in the manner which has already been described in connection with the devices 110 . . . and during this operation as already mentioned, the price is typed out energizing the operating electromagnets 152 of the electric typewriter and simultaneously the operating electromagnets 201 of the adding machine 200. Thus the resulting price may be typed on the sheet held in the typewriter and simultaneously the figures are set on the adding machine. Finally, the end contact 185 is reached by the contact arm 182 and the circuit 188 of the release relay 142 is closed thus bringing this relay back to its original position.

When the contact arm 182 of the device 120, 121 . . . reaches the last contact 186 release coil 108 (in those cases in which a relay 105 has been arranged) is operated, bringing the relay 105 back to its normal position.

All the relays and contact devices have thus been returned to their starting positions.

During the above described operation all the legends forming a line or several lines of the invoice have been typed.

It will be clear, however, that the apparatus which has been above described is to be considered as an example only as the specific methods of driving the contact devices are not essential for the system and may be replaced by other methods of making contacts. Likewise, a specific means for seelcting one operating device or one energizing circuit out of a large number of such devices and circuits is not essential for the system itself and may be replaced by other selection means.

Further, unessential changes in the various details may be made without in any way departing from the essence of the invention as defined in the annexed claims.

What is claimed as new is as follows:

1. A system for automatically operating an electric typewriter provided with key levers and spacing mechanisms and with a plurality of solenoids, each of which operates a key lever or spacing mechanism, comprising a plurality of series of contact devices, each provided with a bank of fixed contacts, and with a movable contact adapted to move over said bank contacts, means for connecting said bank contacts to predetermined ones of the said key lever and spacing mechanism operating solenoids, whereby said solenoids are energized in a predetermined succession when the movable contacts move over the associated bank contacts, manually operated means for selecting a contact device of a first one of the series of contact devices and for initiating its automatic operation, the contact devices of this first series being provided with means for preparing the selection of a group of contact devices from a second and a third series, means for manually selecting one contact device out of the selected group of a second one of the series of contact devices, these latter contact devices being provided with means for completing the selection of one of the contact devices out of a group of the third series which had already been prepared by the contact device of the first series, and means for automatically operating the contact devices for moving the movable contacts over the bank contacts of each contact device upon completion of the selection of a contact device.

2. A machine operator for electric typewriters provided with key levers and spacing mechanisms, and with operating solenoids operating said key levers and spacing mechanism, said machine operator for automatically operating the typewriter to write any one legend selected from a number of legends, comprising a contact device with a movable contact member and with a series of fixed contacts, arranged for being successively contacted by the movable contact member, means for moving said movable contact member in a first direction, said means including a rack member, a driving pinion for the rack member and means for moving said rack member in a second direction, substantially opposite to the first direction to return the rack member into its original position, permanent connections between the fixed contacts and the typewriter solenoids, each forming part of a circuit, means connected with the movable contact member for completing the above named circuits when the movable contact member contacts a fixed contact connected with a typewriter solenoid and means for interrupting the above named circuit when the movable member performs its return movement.

3. A machine operator as claimed in claim 2 wherein the rack member is provided with two racks, and wherein two pinions are provided, each engaging one of the racks driving said movable member in opposite directions.

4. A machine operator as claimed in claim 2, wherein the rack member is swingably arranged, and engages the driving pinion only in one operative position and wherein an electromagnet is arranged the energization of which moves the rack member into the operative position in which the rack member engages the pinion.

5. A machine operator as claimed in claim 2, wherein the rack member is held by a roller, along which it can move said roller forming a fulcrum around which the rack member may tilt.

6. A machine operator as claimed in claim 2, wherein the rack member is provided with supporting pins projecting from it laterally and wherein each rack member moves along supports upon which the pins may rest supporting the rack member when the same is moved by the pinion.

7. A machine operator as claimed in claim 2, wherein the rack member is swingably arranged and engages the driving pinion only in one operative position and wherein an operating electromagnet is arranged, the energization of which moves the rack member into the position in which the rack member engages the pinion, and wherein the rack member is provided with laterally projecting pins, supported on lateral supports when the rack member has been moved by the driving pinion in the first named direction, a roller forming a fulcrum for said rack member over which it moves, which fulcrum is displaceable relatively to the rack member said rack member after having moved by swinging around the fulcrum into operative position upon energization of the magnet, being maintained in its position by the pins resting on the supports with the rack in engagement with the driving pinion after de-energization of the operating electromagnet.

8. A machine operator as claimed in claim 2, wherein the rack member is provided with two racks and wherein two pinions are arranged driving the rack member in substantially opposite directions and wherein the rack member is swingably arranged, swinging around a fixed roller acting as a fulcrum displaceable relatively to the rack member, and wherein the rack member is provided with laterally projecting pins, adapted to be supported on lateral supports of limited length, said rack member being arranged to be swung around the fulcrum by an operating electromagnet, the energization of which brings the rack member in engagement with the driving pinion driving it in the first direction, said pins of the rack member during such movement engaging the lateral supports and resting on them until the rack member has reached the end of its movement, in which position the pins overrun the lateral supports and the rack member drops thereby engaging the second driving pinion which moves it back in the second direction until returned, in which position the rack member is disengaged from the second pinion resting upon the roller and with an end above the operating electromagnet.

9. A machine operator as claimed in claim 2, wherein the contact device is provided with a further series of fixed contacts insulated from the first named series over which the contact member moves, the further series being connected directly with the typewriter solenoids and the contacts of the first named series being connected with the contacts of the second series.

10. A system for automatically operating by remote control, electric typewriters provided with key levers and spacing mechanisms and with solenoids, each of which operates a key lever or spacing mechanism, comprising a series of first contact devices, each provided with a movable member and fixed contacts, means for selecting a contact device of this series manually, said movable member being provided with electromagnetic means for advancing it along the series of contacts when selected and for returning it into its original position, a series of second contact devices each provided with a movable member and fixed contacts, said movable member of each contact device of the series of second devices being provided with means for advancing it along the series of fixed contacts and for returning it into its original position, means for selecting a contact device manually among this series, a first operating circuit section for each typewriter solenoid connected with it and the fixed contact, a second operating circuit section completing the first operating circuit section connected with the movable contact member, a relay controlling the closing and opening of the second operating circuit section of a second contact device, an operating circuit for said relay, said operating circuit being connected with one of the contacts of a first contact device, reached by the movable contact member near the end of its advance, said operating circuit being closed when the movable contact member of the first contact device reaches this position.

11. A system as claimed in claim 10, wherein the relay is a self-locking relay with a release mechanism operated by a release coil, and wherein the release coil is provided with an operating circuit closed by the contact device, the movable contact member of which is connected with the second operating circuit section completing the circuit of the typewriter solenoid, the end contact of which is connected with the operating circuit of the release coil.

12. A system as claimed in claim 10, wherein one of the end contacts of the contact devices of the first series is connected with a further relay having an operating circuit closed when the movable contact member reaches the end contact, the said further relay controlling and closing a circuit forming an incomplete operating circuit section for a group of electromagnets operating a third series of contact devices.

13. A system as claimed in claim 10, wherein one of the end contacts of the contact devices of the first series is connected with a relay having an operating circuit closed when the movable contact member reaches the end contact, the said relay controlling and closing a circuit forming an incomplete operating circuit section for a group of electromagnets operating a third series of contact devices, and wherein one of the end contacts of the second series of contact devices is connected with a further group of electromagnets operating a third series of contact devices, one of which electromagnets also forms part of the first named group, said connection completing the circuit of one of the electromagnets of the third series of contact devices and advancing the movable member thereof over the fixed contacts, the latter being connected with the typewriter solenoids, in such a manner that a legend is written depending on the selection of the contact devices in the first and in the second series.

14. A system as claimed in claim 10, wherein the contact device is manually selected by operating the electromagnetic means thereof, the latter being energized by manually controlled circuits.

15. A system as claimed in claim 10, wherein the contact device is manually selected by operating the electromagnetic means thereof, the latter being energized by manually controlled circuits, each electromagnet being energized by closure of two circuit sections, common to a group of such electromagnets, each electromagnet being simultaneously a part of two groups, each circuit section being closed by a separate switch, the closure of two switches thus determining the selection and energization of a single electromagnet.

16. A system as claimed in claim 10 wherein the return movement of a contact device is produced by a reversing motor, and wherein the direction of rotation of said reversing motor is controlled by a self-locking reversing relay, with two coils one being a forward coil and the other a reversing coil, the former coil having an operative circuit closed at the first contact of the contact and the latter coil having an operative circuit closed at one of the end contacts reached by the moving member at the end of its advance.

17. A system as claimed in claim 10 wherein the return movement of the contact devices is produced by an electric return motor, having an energizing circuit, and wherein for consecutive operation of a plurality of cooperating contact devices, the energizing circuit of the return motor is controlled and opened by a relay, controlled in its turn by one of the last contacts overrun by the contact arm of the first operated among the plurality of cooperating contact devices, said last named relay having a release coil, closing the return motor circuit and energized over a circuit closed when the contact arm of the last one of the plurality of cooperating contact devices reaches its last contact, the return motor then returning simultaneously all the contact arms of the plurality of cooperating contact devices.

18. A system for automatically typing a plurality of preselected legends, words or phrases by remote control of an electric typewriter, provided with key levers and spacing mechanisms and with solenoids, each operating one of said key levers and spacing mechanisms, comprising a plurality of series of separate contact devices, the contact devices of the said series being operated in succession, each contact device of a series being provided with a bank of fixed contacts and with a movable contact moving over the said fixed bank contacts, each fixed bank contact being permanently connected with a typewriter solenoid energizing circuit and the connections being so selected that successively contacted fixed bank contacts are adapted to operate the key levers and spacing mechanisms of the electric typewriter so that a predetermined legend is typed, a separate operating magnet and an energizing circuit for the same for each of said separate contact devices, said magnet, when energized, moving the movable contact over the fixed contacts of the contact bank and closing the energizing circuits of the typewriter solenoids, a separate selector means for each series of contact devices, each selector means including manually operated switches, adapted to select one of the contact devices of the series, and means including contacts of the contact devices of a series, for controlling the operation of the selected contact device in the successive series of contact devices.

19. A system for automatically typing a plurality of preselected legends, words or phrases by remote control of an electric typewriter, provided with key levers and spacing mechanisms and with solenoids, each operating one of said key levers and spacing mechanisms, comprising a plurality of series of separate contact devices, the contact devices of the said series being operated in succession, each contact device of a series being provided with a bank of fixed contacts and with a movable contact moving over the said fixed contacts, each fixed contact being permanently connected with a typewriter solenoid energizing circuit and the connections being so selected that successively contacted fixed contacts are adapted to operate the key levers and spacing mechanisms of the electric typewriter so that a predetermined legend is typed, a separate operating magnet and an energizing circuit for the same for each of said separate contact devices, said operating magnet, when energized, moving the movable contact over the fixed contacts of the contact bank and closing the energizing circuits of the typewriter solenoids, a separate selector means for a number of series of contact devices, each selector means including manually operated switches, adapted to select one of the contact devices of the series, means including contacts of the contact banks of the contact devices of the aforesaid number of series for controlling the operation of the selected contact device in a successively operated series of separate contact devices, and means for selecting a contact device in a further series, adapted to control the typing of a legend dependent on a specific combination of manually selected contact devices in the said number of series, said means including fixed contacts of the contact banks of the contact devices in the aforesaid number of series which have been selected by means of the manual switches, said last named fixed contacts being connected with circuits the combined closing of which produces a selection of the operating magnet of the control device of the further successively operated series.

References Cited in the file of this patent

UNITED STATES PATENTS

| | | |
|---|---|---|
| 1,275,657 | Bullock | Aug. 13, 1918 |
| 2,717,686 | Seeber | Sept. 13, 1955 |